United States Patent Office 3,434,965
Patented Mar. 25, 1969

3,434,965
METHOD OF OPERATING A HYDROFINING PROCESS
Joseph Jaffe, Berkeley, Calif., assignor to Chevron Research Company, San Francisco, Calif., a corporation of Delaware
No Drawing. Filed Sept. 6, 1966, Ser. No. 577,126
Int. Cl. C10g 23/02
U.S. Cl. 208—254                         2 Claims

ABSTRACT OF THE DISCLOSURE

In a hydrofining process using a catalyst comprising molybdenum sulfide or tungsten sulfide, said catalyst is regenerated to produce a sulfate-containing catalyst, the regenerated catalyst is reduced in a gas stream containing 0.1 to 10 mol percent hydrogen until reduction reactions are essentially completed, and the catalyst is resulfided and again used for hydrofining.

Introduction

This invention relates to an improved method of operating a hydrofining process. More particularly it relates to an improved method of operating a hydrofining process with a hydrofining catalyst comprising a sulfide of a metal selected from the group consisting of molybdenum and tungsten.

Prior art problem

A severe problem that heretofore has frequently occurred during the operation of a hydrofining process using a catalyst comprising a compound of a metal selected from the group consisting of molybdenum and tungsten to hydrofine a hydrocarbon feed containing 50 to 20,000 p.p.m. nitrogen in the form of organic nitrogen compounds has been a rapid upward temperature excursion in the catalyst bed that has proceeded out of control at a dangerous rate and to a dangerous level after the first on-stream period and during the period following catalyst regeneration when the catalyst was being reduced and resulfided. Such temperature runaways have been observed in the operation of commercial processes, and can result in danger to equipment and personnel, and damage to the catalyst. Such temperature runaways have been observed after oxidative regeneration of the catalyst, both during the step of reduction of the catalyst prior to sulfiding, and during the sulfiding step itself.

Prior art solutions to temperature runaways caused by excessively rapid hydrogenation of a hydrocarbon feed provide no solution to present problem Temperature runaways in a hydrofining reactor in a bed of catalyst comprising a compound of a metal selected from the group consisting of molybdenum and tungsten also have been observed during startup of the reactor with a fresh catalyst. However, the problem of such temperature runaways, that is, those which can occur at this initial point in the operation of the process, is not the problem with which the present invention is concerned. The problem of temperature runaways when starting up a hydrofining process with a fresh catalyst has been investigated by prior art workers and coped with in a number of different ways. For example, the initial high hydrogenation activity of the catalyst has been poisoned with sulfur compound to ameliorate said activity and prevent local temperature excursions that would otherwise be caused by hydrogenation of a hydrocarbon feed at too rapid a rate. While the prior art workers have made significant contributions in the field of startup of hydrofining processes at the initial stage of the process, that is, when the hydrofining catalyst is fresh, these contributions have not been applicable to the solution of the problem of temperature runaways during reduction and resulfiding steps after the catalyst has been oxidatively regenerated. The disclosures in such prior art as Bercik et al., U.S. Patent 2,953,519 and Mason, U.S. patent application 359,403, owned by applicant's assignee, have contributed no solution to the latter problem, which is solved by the process of the present invention.

Statement of invention

In accordance with the present invention there is provided the method of operating a hydrofining process which comprises continuously reducing to below 50 p.p.m. the organic nitrogen content of a hydrocarbon feed containing 50 to 20,000 p.p.m. nitrogen in the form of organic nitrogen compounds by continuously contacting said feed and added hydrogen under conventional hydrofining conditions wtih a hydrofining catalyst comprising a metal sulfide selected from the group consisting of molybdenum sulfide and tungsten sulfide, said catalyst containing combined sulfide in an amount of 1 to 20 weight percent, calculated as elemental sulfur, based on the entire catalyst composite, discontinuing said contacting when the denitrification activity of said catalyst falls to a level indicating that regeneration of said catalyst is desirable, regenerating said catalyst in the presence of an oxygen-containing gas under conventional regeneration conditions to produce a sulfate-containing catalyst, reducing said regenerated catalyst in a gas stream containing 0.1 to 10 mol percent hydrogen, at a temperature in the range 550° to 750° F. and a pressure in the range 15 to 10,000 p.s.i.g. until reduction reactions are essentially completed, resulfiding said regenerated and reduced catalyst, and resuming said contacting of said feed and added hydrogen with said resulfided catalyst under said conventional hydrofining conditions.

The process of the present invention is especially useful when the hydrogen content of said gas stream is maintained at 1 to 4 mol percent, when said reduction temperature is maintained in the range of 600° to 650° F., and when said reduction pressure is maintained in the range 400 to 3000 p.s.i.g.

The conventional hydrofining conditions may include a temperature of 500°–850° F., a pressure of 200–4000 p.s.i.g., a space velocity of 0.2–10 LHSV, and a hydrogen throughput of 1000–10,000 s.c.f. per barrel of hydrocarbon feed.

Possible reasons for success of process of present invention in preventing temperature runaways Any theory set forth herein to explain the success of the process of the present invention in enabling a hydrofining process to be operated without intolerable temperature excursions in the catalyst bed during the interval between on-stream periods is intended only as a possible explanation and not as a binding limitation. The following explanation will set forth probable reasons for the success of the process, to contribute to a better understanding of the invention.

It is known that hydrofining catalysts comprising a hydrogenating component comprising a compound of a metal selected from the group consisting of molybdenum and tungsten have a high metal sulfide content, either because the hydrogenating component compound is in the form of a metal sulfide at the outset or because the catalyst becomes heavily sulfided from sulfur compounds in the hydrocarbon feed shortly after process operation has begun. During conventional oxidative regeneration of such a catalyst the sulfides are converted in large proportion to sulfates. This probably takes place in a stepwise manner in which the metal sulfides and oxygen first combine to give metal oxides and sulfur dioxide. The sulfur dioxide combines with oxygen to give sulfur trioxide, which combines with metal oxides to give metal sulfates, in reactions catalyzed by the metals present in the system. Coke that is present on the catalyst during these regeneration reactions burns to carbon dioxide. It is possible that there is formed not only sulfates of the metal hydrogenating component or components but also sulfates of aluminum that may be present in the hydrofining catalyst support.

The process of the present invention involves the recognition that temperature runaways during a catalyst reduction step following regeneration of a hydrofining catalyst comprising a sulfide of a metal selected from the group consisting of molybdenum and tungsten, which catalyst has been used to hydrofine a hydrocarbon feed containing 50 to 20,000 p.p.m. nitrogen in the form of organic nitrogen compounds, are at least in large measure attributable to the excessively rapid reduction of metal sulfates to metal sulfides in addition to the reduction of metal oxides. Further, it has been found that the rate of the latter reaction is undesirably accelerated by its amenability to catalysis at low temperatures by the sulfides formed from reduction of the sulfates. Both of these reduction reactions are exothermic, and prior art procedures using reducing gases containing a high percentage of hydrogen have caused the reduction reactions to proceed in an uncontrolled manner with such a high heat release in a short period of time that the resulting temperature levels in the catalyst bed have created danger for personnel and equipment and in some cases have damaged the catalyst. It is probable that such prior art procedures involved the use of a reducing gas containing a large percentage of hydrogen because the prior art was unaware that large amounts of sulfates as well as oxides had been formed during regeneration, and that the sulfates would give up large amounts of heat during reduction in addition to the heat given up by the metal oxides during reduction. The sulfate content of regenerated hydrofining catalysts comprising a compound of a metal selected from the group consisting of molybdenum and tungsten can range from 2 to 20 percent by weight of the total catalyst.

In situ regeneration versus kiln regeneration

More sulfates probably are formed during catalyst regeneration if the regeneration is accomplished with the catalyst in situ in the hydrofining reactor than during catalyst regeneration in a separate kiln to which it has been transferred from the hydrofining reactor, because in the latter case more sulfur dioxide that is formed can be removed from the reaction zone during kiln regeneration than during an in situ regeneration, and therefore less is available for reaction to sulfates. However, the heat released during the subsequent reduction step, is so large even in the kiln regeneration situation that it must be controlled in order to prevent temperature runaways during that step. Furthermore, the heat release during the reduction step is attributable not only to reduction of the sulfates that were formed during regeneration, but also to the reduction of certain metal oxides. Accordingly, while the temperature runaway problems that are solved by the process of the present invention may be more severe in the case of catalysts that have been regenerated in situ, the problems still exist in the case of catalysts that have been regenerated ex situ in a kiln, and the regeneration step of the process comprehends both types of regeneration. The reduction step also may be accomplished in situ or ex situ.

In situ regeneration, reduction and sulfiding

The process of the present invention is especially useful when all of the steps of regeneration, reduction and sulfiding of the hydrofining catalyst are accomplished in situ in the hydrofining reactor. In such case, upon termination of a hydrofining on-stream period hydrocarbons may be drained from the hydrofining reactor, the catalyst is regenerated in situ in the reactor in a conventional manner under conventional regeneration conditions, the catalyst bed is purged with an inert gas, for example nitrogen, the temperature is raised to 550° to 750° F., and reduction and sulfiding are accomplished in situ. Whether accomplished in situ or ex situ, the reduction and sulfiding steps are accomplished as discussed below.

Reduction step

The reducing step is accomplished by continuously contacting the catalyst bed with a gas stream comprising an inert gas, for example nitrogen, and hydrogen. The total gas rate may be 40 to 25,000 cubic feet of gas per cubic foot of catalyst.

The hydrogen concentration and conditions for the reducing step, previously given, may be summarized as follows:

|  | Broad | Preferred |
| --- | --- | --- |
| Hydrogen concentration, mol percent | 0.1–10 | 1–4 |
| Temperature, ° F. | 550–750 | 600–650 |
| Pressure, p.s.i.g. | 15–10,000 | 400–3,000 |

Reduction temperatures above 750° F. are avoided, because it has been found that temperatures of about 800° F. and higher damage the catalyst.

The reducing step is operated continuously until reduction reactions in the catalyst bed are essentially completed. Their essential completion may be determined by noting one or more of the various manifestations of completion, for example the dying out of temperature waves in the catalyst bed and the equalization of hydrogen concentration in the inlet and exit gases. Operation in this manner results in a safely controlled release of the heat of the exothermic reduction reactions.

Upon completion of the reduction reactions, which include reduction of sulfates to sulfides, the resulting reduced catalyst is necessarily partly sulfided, which facilitates completion of the sulfiding in the subsequent sulfiding step.

Hydrogen used in the reduction step preferably is manufactured or electrolytic hydrogen rather than hydrogen recovered from a catalytic reformer which contains hydrocarbons that may react on the reduced catalyst and affect it adversely.

Reoxidation

Contrary to many prior art procedures, it is highly preferred in the process of the present invention not to reoxidize the catalyst prior to sulfiding, because of the possibility of forming further quantities of sulfate as well as oxides, both of which will give up heat to the extent that they are reduced in the hydrogen atmosphere of the sulfiding step, thereby causing potential temperature runaway problems during that step.

Cooling prior to sulfiding

Following the reduction step and prior to the sulfiding step it may be found desirable to cool the catalyst bed. Those skilled in the art will recognize that one reason for such cooling is to insure a sulfiding temperature low enough to prevent the danger of sintering reactions on the catalyst surface that might otherwise take place in the hydrogen atmosphere of the sulfiding step at temperatures above about 700° F., particularly in view of the exothermic nature of the sulfiding reactions. Those skilled in the art also will recognize that the degree of cooling depends in part on the sulfiding agent to be used. For example, a temperature well below 400° F., would be appropriate during sulfiding with $H_2S$, whereas when sulfiding with mercaptan a temperature of at least about 400° F., would be necessary to insure decomposition of the mercaptan. In any event it is preferred to cool the catalyst bed, from the temperature at completion of the reduction step, to a temperature in the range 60° to 600° F., preferably 60° to 500° F.

Sulfiding step

Any conventional sulfiding medium may be used. Hydrogen sulfide, mercaptan and carbon disulfide are preferred sulfiding agents. Any conventional sulfiding procedure may be used. A satisfactory procedure comprises cooling the reactor to about 400° F., raising the hydrogen partial pressure to about 25 to 100%, adjusting the temperature to the appropriate level for introduction of the sulfiding agent selected, introducing the sulfiding agent in an amount corresponding to 1–2% equivalent $H_2S$, raising the temperature to about 600° F., maintaining said temperature of about 600° F. for 1–3 hours, and adjusting the catalyst bed temperature to the temperature at which it is again to be contacted with the hydrocarbon feed.

EXAMPLE 1

A fresh hydrofining catalyst comprising an alumina support, 6.4 weight percent nickel and 21.1 weight percent molybdenum was sulfided and used in denitrification service until regeneration was necessary. The catalyst was regenerated, and a sample of the regenerated catalyst from near the bottom of the hydrofining reactor was obtained, analyzed and found to comprise sulfate having a sulfur content, calculated as elemental sulfur, of 2.07 weight percent, based on the entire catalyst. The remaining catalyst in the reactor was contacted with 100% hydrogen at 1500 p.s.i.g. at a temperature below 350° F. Upon raising the temperature to 350° F. an uncontrolled thermal excursion occurred, during which peak temperatures of about 900° F. were measured.

EXAMPLE 2

The fresh catalyst of Example 1 was used in denitrification service in a different run until regeneration was necessary. The catalyst was regenerated, and a sample of the regenerated catalyst from near the top of the hydrofining reactor was obtained, analyzed, and found to comprise sulfate having a sulfur content, calculated as elemental sulfur, of 4.46 weight percent, based on the entire catalyst.

EXAMPLE 3

The regenerated catalyst samples obtained in Examples 1 and 2, and samples of the fresh catalyst used in Examples 1 and 2, were separately contacted with hydrogen in nonadiabatic laboratory equipment at 1500 p.s.i.g. hydrogen pressure, and a temperature below 500° F. In each case the temperature was gradually raised. No detectable runaway temperature, or exotherm, resulted in the case of the fresh catalyst, although the temperature was raised to 580° F. In the case of each of the regenerated catalysts uncontrolled temperature excursions occurred, as follows:

|  | Temperature range in which excursion occurred (° F.) | Magnitude of excursion (° F.) |
| --- | --- | --- |
| Regenerated catalyst of example 1 | 500–550 | 50–60 |
| Regenerated catalyst of example 2 | 500–550 | 150–200 |

EXAMPLE 4

The regenerated catalyst of Example 2 is reduced at 600° F. in a stream of nitrogen and hydrogen, containing the hydrogen in a concentration of 2 mol percent, at 1500 p.s.i.g., until reduction reactions are essentially completed. No temperature excursion is detected during this treatment. The catalyst is cooled to below 500° F., then heated again in 100% hydrogen to 580° F. No detectable temperature excursion takes place, indicating that the heat of reaction of the reduction reactions has been substantially completely released in a controlled manner during the prior treatment with a gas stream containing hydrogen in low concentration.

EXAMPLE 5

A regenerated hydrofining catalyst having the composition, including sulfate content, of the catalyst in Example 2 was reduced at 600° F. in a stream of nitrogen and hydrogen, containing the hydrogen in a concentration of 2 mol percent, at 1500 p.s.i.g., until reduction reactions were essentially completed. No temperature excursion was detected during this treatment. Following the reduction the catalyst was sulfided at 1500 p.s.i.g., with mercaptan in an atmosphere of approximately 25 mol percent hydrogen and 75 mol percent nitrogen. The sulfiding was initiated at 450° F. and during the sulfiding the temperature was raised to 580° F. Following completion of the sulfiding the catalyst was used to hydrofine a light cycle oil. The catalyst was found to have the same hydrofining activity as it has when fresh, and after 300 hours on stream showed no decline in hydrofining activity.

I claim:
1. The method of operating a hydrofining process which comprises continuously reducing to below 50 p.p.m. the organic nitrogen content of a hydrocarbon feed containing 50 to 20,000 p.p.m. nitrogen in the form of organic nitrogen compounds by continuously contacting said feed and added hydrogen under conventional hydrofining conditions with a hydrofining catalyst comprising a metal sulfide selected from the group consisting of molybdenum sulfide and tungsten sulfide, said catalyst containing combined sulfur in an amount of 1 to 20 weight percent, calculated as elemental sulfur, based on the entire catalyst composite, discontinuing said contacting when the denitrification activity of said catalyst falls to a level indicating that regeneration of said catalyst is desirable, regenerating said catalyst in the presence of an oxygen-containing gas under conventional regeneration conditions to produce a sulfate-containing catalyst, reducing said regenerated catalyst in a gas stream containing 0.1 to 10 mol percent hydrogen, at a temperature in the range 550° to 750° F. and a pressure in the range 15 to 10,000 p.s.i.g., until reduction reactions are essentially completed, resulfiding said regenerated and reduced catalyst, and resuming said contacting of said feed and added hydrogen with said resulfided catalyst under said conventional hydrofining conditions.

2. The method as in claim 1, wherein said regenerated catalyst comprises metal sulfate in an amount of 2 to 20 weight percent, based on the entire catalyst, wherein said gas stream contains 1 to 4 mol percent hydrogen, and wherein said reduction temperature is in the range 600° to 650° F., and wherein said reduction pressure is in the range 400 to 3000 p.s.i.g.

References Cited

UNITED STATES PATENTS 2,270,165   1/1942   Groll et al. _____ 252—465
2,793,170   5/1957   Stiles et al. _____ 252—465

DELBERT E. GANTZ, Primary Examiner.

GEO. J. CRASANAKIS, Assistant Examiner.

U.S. Cl. X.R.

208—216; 252—416, 439